United States Patent
Lauricella, Jr.

[11] Patent Number: 6,062,583
[45] Date of Patent: May 16, 2000

[54] HITCH LOCK DEVICE

[76] Inventor: Salvatore Lauricella, Jr., 33 Broezel St., Lancaster, N.Y. 14086

[21] Appl. No.: 09/243,652

[22] Filed: Feb. 3, 1999

Related U.S. Application Data

[63] Continuation-in-part of application No. 08/939,391, Sep. 29, 1997, abandoned.

[51] Int. Cl.[7] ........................................... B60D 1/06
[52] U.S. Cl. ........................................... 280/507; 280/511
[58] Field of Search ..................... 280/507, 511; 70/232, 258, 168, 163; 292/DIG. 17

[56] References Cited

U.S. PATENT DOCUMENTS

| | | | |
|---|---|---|---|
| 2,785,564 | 3/1957 | Rossi | 70/232 |
| 3,269,159 | 8/1966 | Young | 70/232 |
| 4,541,256 | 9/1985 | Green | 70/232 |
| 4,577,884 | 3/1986 | Harris | 280/507 |
| 4,697,444 | 10/1987 | Maffey | 70/232 |
| 4,730,841 | 3/1988 | Ponder | 280/507 |
| 4,836,570 | 6/1989 | Lopez et al. | 280/507 |
| 5,359,866 | 11/1994 | Boddy | 70/232 |
| 5,511,814 | 4/1996 | Floyd | 280/507 |
| 5,584,495 | 12/1996 | Mason | 280/507 |

FOREIGN PATENT DOCUMENTS

| | | | |
|---|---|---|---|
| 929550 | 7/1947 | France | 70/232 |
| 532379 | 8/1955 | Italy | 70/232 |
| 678556 | 9/1991 | Switzerland | 70/232 |

*Primary Examiner*—J. J. Swann
*Assistant Examiner*—Michael Cuff
*Attorney, Agent, or Firm*—Crossetta & Associates

[57] ABSTRACT

A novel hitch lock device, which can be removably mounted to vehicular ball type towing hitch arrangements for removably locking a common vehicular pivot ball type coupler to a ball hitch, while enabling hitch function in a plurality of angles and planer orientations.

16 Claims, 2 Drawing Sheets

HITCH LOCK DEVICE

This invention relates to a novel removable hitch lock device, useful for preventing accidental de-coupling of vehicular ball type towing hitch arrangements while providing a security lock among coupler and ball hitch. This is a Continuation In Part of copending U.S. Ser. No. 08/939,391, filed Sep. 29, 1997 now abandoned.

BACKGROUND OF THE INVENTION

Ball type hitch arrangements are well known in the prior art, for pivotally securing a vehicle, trailer or the like to a pulling vehicle. In such arrangements, a ball hitch generally comprises a ball shaped knob on the end of an attachment shaft, the shaft being rigidly mounted to a frame, bumper or the like of the pulling vehicle such that the knob end extends upwardly therefrom. A coupler is mounted to another vehicle, trailer or the like and generally comprises a receiving socket which mates over the ball, to form a ball and socket arrangement enabled for removably engaging the ball. The coupler is generally a socket clamp arrangement, designed to engage the ball with a fixed structure surrounding the top and sides of the ball and a removable bottom clamping means being arranged to removably clamp the underside of the ball into the surrounding fixed structure. Such bottom clamping means must be arranged for convenient de-coupling of the hitch and generally comprises a "Y" arrangement which engages the underside of the ball where it is necked down to the attachment shaft thereof.

For general highway use such bottom clamping means is generally suitable for holding the ball within the coupler and securely maintaining the device from de-coupling. With the proliferation of sporting vehicles such as boats and off-road vehicles, it is not unusual that the arrangement is subjected to unusual stress conditions wherein the generally co-planer orientation of the coupled vehicles becomes angular, and the bottom clamping means is subjected to unusual forces which tend to strain the security of the coupler and may cause failure of the bottom clamping means. In situations wherein a ball hitch and coupler arrangement may be used as an attachment point for a winching device, angles of coupling vary dramatically from co-planer orientation; and the bottom clamping means may be more prone to failure.

It is an object of the present invention to provide an improved hitch lock device, for securing a ball coupler against de-coupling.

It is a further object of the invention to provide an improved hitch lock device which can be removably mounted to ball type towing hitch arrangements.

It is still another object of the invention to provide an improved hitch lock device which enables hitch function in a plurality of angles and planer orientations.

These and other objects of the invention will become apparent in the following recitation of the invention.

SUMMARY OF THE INVENTION

The present invention comprises an improved ball hitch and ball hitch lock device, which conveniently mount to a hitch collar member of a vehicle to secure a ball hitch coupler from unintended detachment while enabling the hitch coupler to pivot through a wide directional arc in varying planes of orientation.

The apparatus of the invention comprises opposing mating "U" shaped base and top members, the opposing mating legs of which engage to surround the pivot knob of a ball hitch. It should be understood by "U" shaped is also meant to include channel and the like arrangements. The base of the "U" of the base member has a hole therethrough sized to encircle a generally cylindrical collar surface of the ball hitch and enable the base member to rotate through an arc around the carriage surface.

The ball hitch comprises a threaded attachment shaft at about one end and a ball at the opposite and. The collar surface is positioned between the ball and the end of the attachment shaft and a base mounting shoulder is arranged between the collar surface and the ball. The base mounting shoulder is sized greater than the hole in the base member and is arranged to engage the base and prevent movement of the base member axially along the ball hitch from the collar surface toward the ball. The collar surface is sufficiently deep to extend beyond the thickness of the base member upon assembly, and has a circumference greater than the circumference of the threaded attachment shaft immediately adjacent thereto, such that the ball hitch can be fixedly mounted to a vehicle hitch carrier member by means of the threaded attachment shaft, without disabling rotational movement of the base member around the collar surface.

The legs of the "U" shaped top member are generally removably mounted to the mating legs of the "U" shaped base member. In one embodiment, a leg of the top member is hingedly mounted to a mating leg of the base member and the other mating legs comprise locking means arranged for securing a detachably mounted top member to the base member. In a preferred embodiment, the butt ends of mating legs are offset notched to form offset extensions which mate in pintle alignment. A pin is mounted to the offset extension of one mating leg and the offset extension of the other mating leg comprises a bore into which the pin inserts to secure the abutting ends of the legs together. In a further preferred embodiment, mating offset notched legs comprise key lock means which securely lock said pin into said bore. In a particularly preferred embodiment, pins are fixedly mounted to offset extensions of the legs of the top member, mating bores are comprised in offset extensions of the legs of the bottom member, and a tumbler key lock means is arranged to rotate a pin of the top member which engages and twist locks into a mating bore of the bottom member.

The top member of the assembled hitch lock device is configured so that when a ball hitch coupler is mounted to the ball hitch, the top member of the hitch lock device is in spaced alignment from the top of the ball hitch a distance less than the space required to remove the coupler from the ball. Thus, when hitch lock device is assembled around a ball hitch, the top member cooperates with the ball hitch to provide a barrier to prevent uncoupling in the event the coupler fails and/or is otherwise enabled to lift upwardly and uncouple.

In a preferred embodiment, the base of the "U" of the top member is in spaced opposition to the top of the ball, the spaced distance being less than the distance necessary to enable unrestrained uncoupling. As the hole in the bottom member is generally coaxial with the pivot knob of a ball hitch, the depth of the connecting top base is generally sized so that upon alignment of mating top and bottom "U" shaped members, at least a portion of the circular hole in the connecting bottom base is not in opposing alignment with the connecting top base. In a preferred embodiment, such portion is generally less than an amount comprising alignment with about ⅔ the diameter of the pivot knob.

The base of the "U" of the top member can be aligned and dimensioned to be in spaced opposition to the whole or part of the diameter of the ball. Dimensioning and/or configuring the base in spaced aligned opposition to a part of the diameter of the ball enables convenient use of the device with conventional couplers having clamping, adjustment means and the like which extend from the top of the coupler. In a preferred embodiment of partial alignment, the base of the "U" of the top member is in opposing alignment through at least about ¼ of the diameter of the pivot knob.

In a further embodiment, the top member comprises means for adjusting spaced distance between the top surface of the coupler and the base of the top member, generally including a screw means which adjustbly extends an engaging member from the top member against the top surface of the coupler.

For a fuller understanding of the device of the present invention, reference should be made to the following detailed description taken in connection with the accompanying drawings.

DETAILED DESCRIPTION OF THE INVENTION

Figure 1:
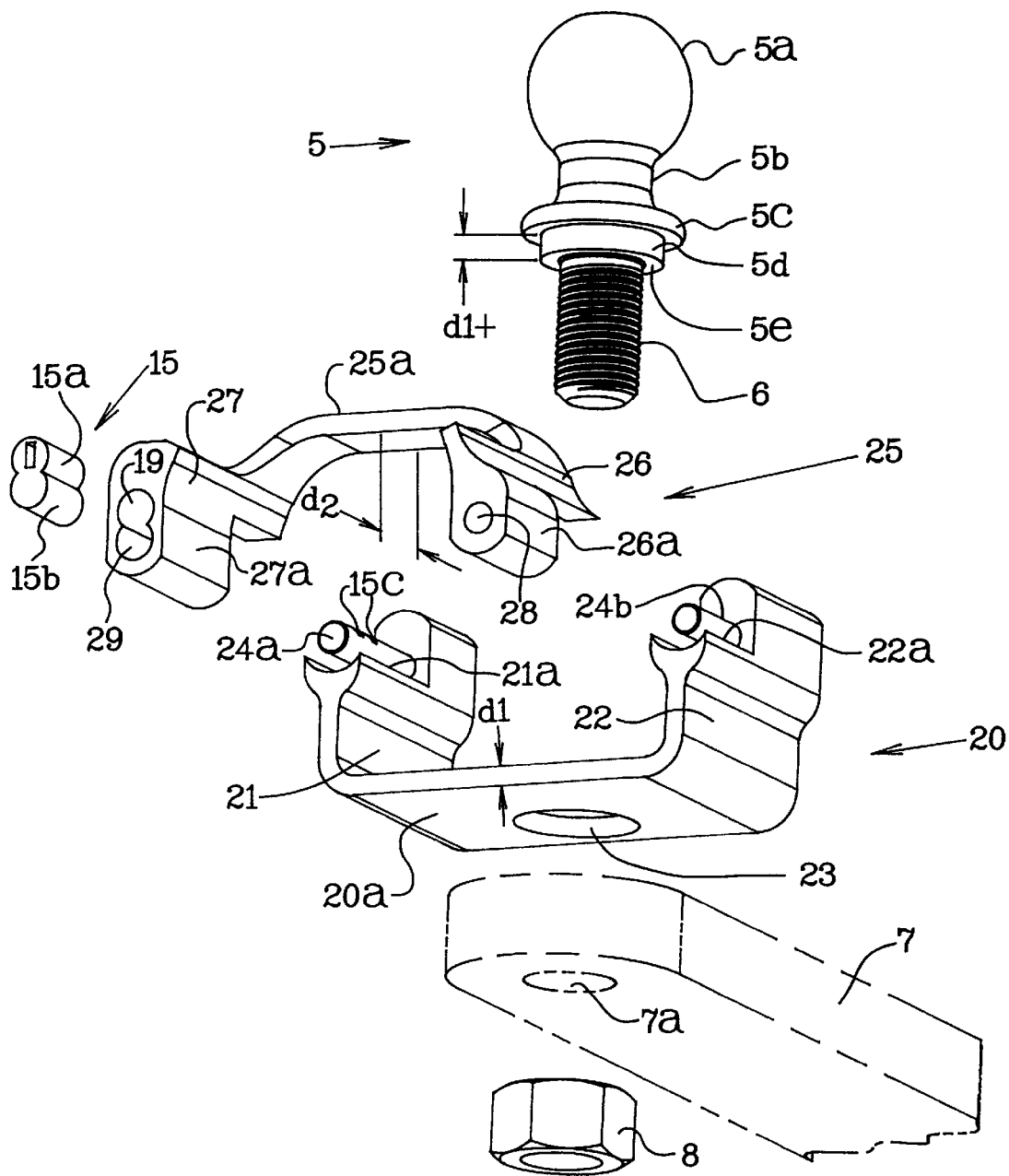
FIG. 1 is an exploded perspective view of a hitch lock device and juxtaposed ball hitch of the invention.

Referring now to FIG. 1, therein is illustrated a hitch lock device of the invention, juxtaposed with a ball hitch of the invention, illustrated in accord with mounting to a vehicle carrier member 3 in phantom.

Ball hitch 5 is illustrated as comprising pivot knob 5a, neck 5b, base mounting shoulder 5c, collar surface 5d carrier mounting shoulder 5e and threaded attachment shaft 6. The hitch lock device and ball hitch are illustrated as generally aligned for mounting to a vehicle support member 7 (shown in phantom), which is generally a support platform or the like comprising a mounting hole 7a, the support member being attached to the frame, bumper and tie like of the vehicle.

A ball hitch coupler would generally be mounted to a drawbar of the object being towed and generally comprises a socket structure at an end thereof, which mounts over pivot knob 5a of the ball hitch. In its locked position, the hitch lock device of the invention generally surrounds the mounted end of the ball hitch coupler preventing the coupler from being disengaged without first unlocking the device. Ball hitch couplers are well known in the art and conventionally comprise a clamping mechanism which moves a yoke arrangement to a position adjacent ball hitch 5 to allow entry of pivot knob 5a into the socket structure, and moves the yoke arrangement to a coupler lock position which engages about the neck 5b of ball hitch 5 engaging the underside of pivot knob 5a and securing pivot knob 5a within the socket structure of the coupler from detachment from the ball hitch.

FIG. 1 illustrates an embodiment of the hitch lock device comprising "U" shaped base member 20, having legs 21 and 22 extending from base 20a. Base 20a has a hole 23 therethrough which has a diameter less than that of base mounting shoulder 5c of ball hitch 5, but sized large enough to rotatably mount about collar surface 5d. Collar surface 5d is depicted as having a diameter greater thall threaded shaft 6, which is sized to mount through a corresponding hole 7a in the vehicle support member or the like, with carrier mounting shoulder 5e engaging the top of the support member. Thus, ball hitch 5 is held to the frame member by resting against carrier shoulder 5e and retained in place by threaded nut 8. Collar surface 5d is sized greater d1+ than the thickness d1 of base 20a, enabling base 20a to rotate around collar surface 5d when the hitch ball is locked to the vehicle support member, and is restrained from axial movement by base mounting shoulder 5c and the surface of the vehicle carrier member to which the ball hitch is mounted.

Legs 21 and 22 of "U" shaped base member 20 are offset notched 21a,22a to mate with corresponding offset extensions 27a,26a of legs 27 and 26 of "U" shaped top member 25. In the depicted embodiment of FIG. 1, legs 21 and 22 of base member 20 are arranged to comprise pins 24a and 24b which extend into notches 21a and 22a respectively from the un-notched offset portion of legs 21 and 22. Offset extension 26a of leg 26 of top member 25, comprises bore 28, which is sized and dimensioned to accept the insertion of pin 24b for mounting the top member to the base member. Offset extension 27a of leg 27 of top member 25, also generally comprises a bore sized and dimensioned to accept the insertion of a pin, however, in the illustrated embodiment of FIG. 1, leg 27 comprises overlapping bores 19 and 29, which are arranged and sized to accept a conventional key lock device 15. Key lock devices are generally conventional in the prior art and in the illustrated embodiment comprises a keyed actuation section 15a and a locking section 15b, with the locking section comprising an axial bore (not shown), sized to accept the insertion of slotted pin 24a and lockingly engage the pin within the axial bore of the key lock device by moving a sliding stop into one or more mating slots 15c in pin 24a, through activation of the keyed actuation section.

In the illustrated embodiment, base 25a of top member 25, is shown as being sized to a depth d2 to surround only a portion of the diameter of the pivot knob 5a of the ball hitch and not the entire diameter of the pivot knob.

Figure 2:
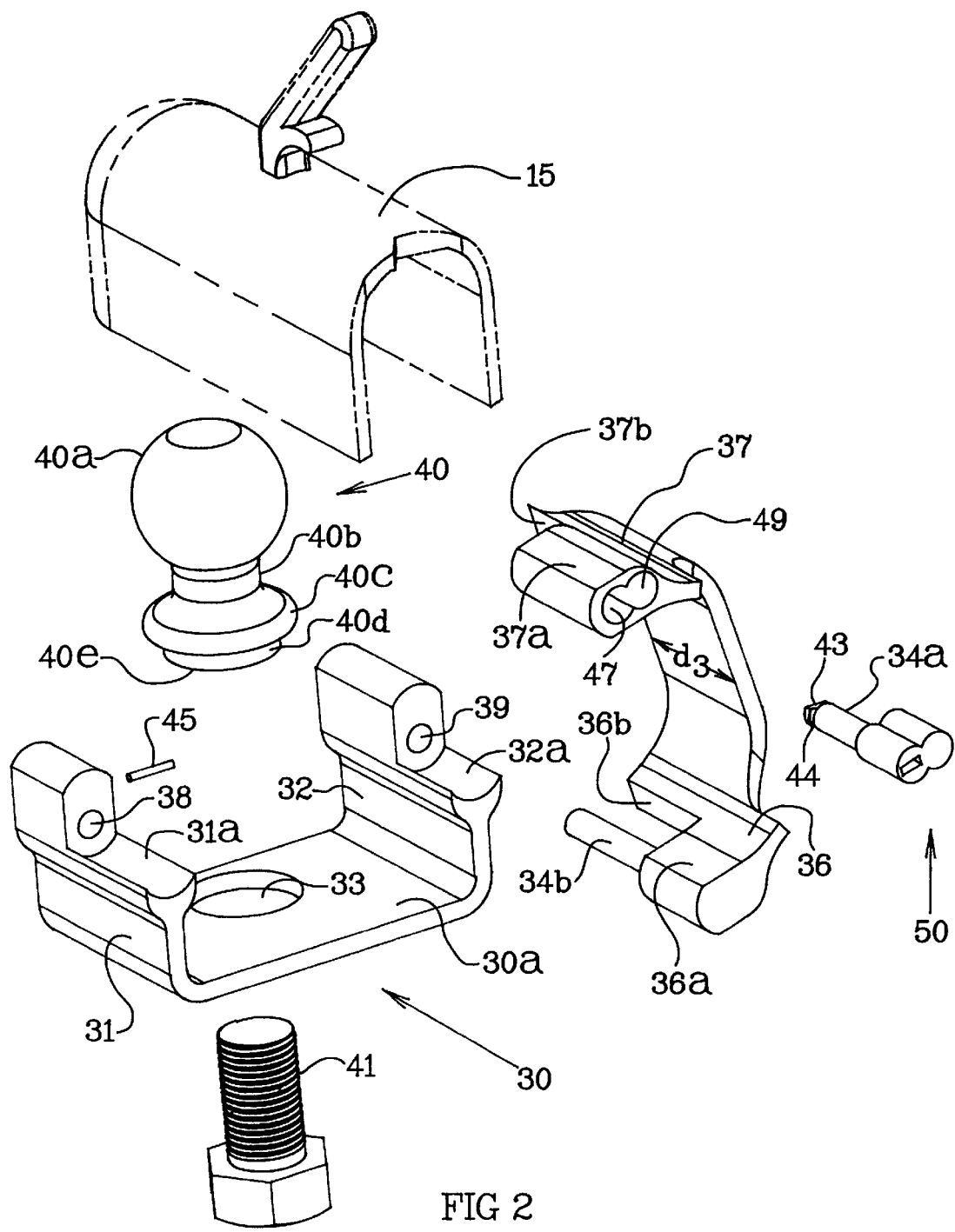
FIG. 2 is an exploded perspective view of another embodiment of the hitch lock device and juxtaposed ball hitch of the invention.

FIG. 2 illustrates an embodiment of the hitch lock device and ball hitch of the invention, wherein the ball hitch is bolt attached to a vehicle carrier member and shown juxtaposed with a conventional ball hitch receiver/coupler.

In this embodiment, the ball hitch 40 is illustrated as comprising pivot knob 40a, neck 40b, base mounting shoulder 40c, collar surface 40d and carrier mounting shoulder 40e. Threaded shaft 41 is illustrated as comprising a bolt type arrangement wherein a threaded bolt screws into mating threads in an axial bore (not shown) in the ball hitch, the threaded bolt comprising the means for mounting the ball hitch to a vehicle carrier member by engaging carrier mounting shoulder 40e against the top surface of the vehicle carrier member.

The conventional ball hitch coupler 15 (shown in phantom), would generally be mounted to a drawbar of a trailer or the like, and generally comprises a handle or the like other arrangement which extends from the top of the coupler and is pivoted to a vertical position to disengage a gripping yoke to allow entry of pivot knob 40a into the receiver and pivoted to a generally horizontal position to engage the yoke against the underside of the pivot knob to engage about neck 40b and secure pivot knob 40a ball into the receiver. In the embodiment of FIG. 2, the handle or the like of the coupler is illustrated as set back from the centerline of the socket receiving the pivot knob of the ball hitch.

In FIG. 2, the hitch lock device comprises "U" shaped base member 30, having legs 31 and 32 extending from base 30a. Base 30a has a hole 33 therethrough which has a diameter less than that of base mounting shoulder 40c of ball hitch 40, but sized large enough to rotatably mount about collar surface 40d. Collar surface 40d is depicted as having a diameter greater than threaded shaft 41, which is sized to mount through a corresponding hole in the vehicle support member (not shown) or the like, with carrier mounting shoulder 40e engaging the top of the vehicle carrier member. Thus, ball hitch 40 is held to the frame member by resting against carrier shoulder 40e and retained in place by the bolt. Collar surface 40d is sized greater than the thickness of base 30a, enabling base 30a to rotate around collar surface 40d when the hitch ball is locked to the vehicle support member, and is restrained from axial movement by base mounting shoulder 40c and the surface of the vehicle carrier member to which the ball hitch is mounted.

Legs 31 and 32 of "U" shaped base member 30 are offset notched 31a,32a to mate with corresponding offset extensions 37a,36a of legs 37 and 36 of "U" shaped top member 35. In the depicted embodiment of FIG. 2, legs 31 and 32 of base member 30 are arranged to comprise bores 38 and 39, while offset extensions 36a and 37a of legs 36 and 37 of top member 35, comprise pins 34a and 34b which extend into notchs 36b and 37b respectively from the un-notched offset portion of legs 36 and 37. Bores 38 and 39 are sized and dimensioned to accept the insertion of pins 34a and 34b respectively for mounting the top member to the base member.

In this illustrated embodiment, leg 37 comprises overlapping bores 49 and 47, which are sized to accept another version of a key lock device, wherein pin 34a is mounted to the key lock device 50, is enabled to rotate by the key lock means, while the key lock device 50 is arranged to slide in and out of the overlapping bores, between limit stops (not shown), enabling pin 34a to be inserted and withdrawn from bore 38 of leg 31 of the base member. In this embodiment, cylindrical pin 34a is notched 43 at its end and circumferentially slotted 44 in the curved surface adjacent the notch. Bore 38 is fitted with a pin stop 45 traversing the bore which enables the end of pin 34a to be inserted and removed when the notch is aligned with the pin stop. The circumferential slot is sized to accept the pin stop so that when the circumferential slot of pin 34a is aligned with the pin stop, pin 34a can be rotated and the pin stop seats within the circumferential slot to prevent removal of pin 34a. Further, in the illustrated embodiment, the depth of base 35a of top member 35, is shown as being sized d3 to surround about ¾ of the diameter of pivot knob 30a of the ball hitch and not the entire diameter of the pivot knob.

I claim:

1. A hitch lock assembly comprising:
    a "U" shaped bottom member, comprising first and second bottom legs extending upwardly to butt ends from a connecting bottom base, said connecting base comprising a generally circular hole therethrough and said butt ends of said bottom legs being offset notched;
    a "U" shaped top member, said top member having first and second top legs extending downwardly to butt ends from a connecting top base, said butt ends of said top legs being offset notched, said top member being arranged to oppose said bottom member wherein said offset notched butt ends of said top legs are in mating reverse butting alignment with said offset notched butt ends of said bottom legs;
    first and second pin means, mounted to one leg of each mating top and bottom leg, each of said pin means extending into the offset notch of said one leg, and being aligned and sized to insert into an aligned mating bore in the other mating leg; and
    key actuated lock means, arranged to engage and disengage at least one of the first and second pin means in a bore of a mating top and bottom leg in locked resistance to withdrawal of the pin from the bore.

2. The hitch lock assembly of claim 1 wherein one of the first and second pin means is rotatably mounted to one leg of a mating top and bottom leg.

3. The hitch lock assembly of claim 1 wherein one of the first and second pin means is mounted for axial movement in a leg of a mating top and bottom leg.

4. The hitch lock assemble of claim 3 wherein said pin mounted for axial movement is mounted to a mating bottom leg.

5. The hitch lock assembly of claim 1 wherein said pin means are mounted to each leg of said "U" shaped top member and are arranged to extend into mating bores of aligned legs of said "U" shaped bottom member.

6. The hitch lock assembly of claim 1 wherein said lock means comprises a key actuated tumbler means arranged to engage and disengage a pin means.

7. The hitch lock assembly of claim 6 wherein said key actuated tumbler means is arranged to secure a pin from axial movement in a bore.

8. The hitch lock assembly of claim 1 wherein said lock means comprises a key actuated tumbler means arranged to enable the rotation of a pin means.

9. The hitch lock assembly of claim 8 wherein said tumbler means is arranged to enable rotation of a pin in a bore.

10. The hitch lock assembly of claim 9 comprising means arranged in said bore to mating engage said pin upon rotation thereof, and resist axial movement of said pin in said bore.

11. The hitch lock assembly of claim 1 wherein the depth of said connecting top base is sized smaller than the depth of said connecting bottom base.

12. The hitch lock assembly of claim 11, wherein said depth of said connecting top base is sized so that upon alignment of mating top and bottom "U" shaped members, at least a portion of said circular hole in said connecting bottom base is not in opposing alignment with said connecting top base.

13. The assembly combination comprising a hitch lock and a ball hitch assembly, said hitch lock comprising:
    a "U" shaped bottom member, comprising first and second bottom legs extending upwardly to butt ends from a connecting bottom base, said connecting bottom base comprising a generally circular hole therethrough and said butt ends of said bottom legs being offset notched;
    a "U" shaped top member, said top member having first and second top legs extending downwardly to butt ends from a connecting top base, said butt ends of said top legs being offset notched, said top member being arranged to oppose said bottom member wherein said offset notched butt ends of said top legs are in mating reverse butting alignment with said offset notched butt ends of said bottom legs;
    first and second pin means, mounted to one leg of each mating top and bottom leg, each of said pin means extending into the offset notch of said one leg, and being aligned and sized to insert into an aligned mating bore in the other mating leg; and
    key actuated lock means, arranged to engage and disengage at least one of the first and second pin means in a bore of a mating top and bottom leg in locked resistance to withdrawal of the pin from the bore;

said ball hitch comprising an elongate member having a first end thereof shaped in a generally spherical ball for engagement with a ball hitch receiver and a second end arranged for attachment to a vehicle;

said elongate member comprising a raised base mounting shoulder arranged between and spaced from said generally spherical shaped ball and from said second end, and a generally cylindrical collar arranged between said raised shoulder and said second end;

said generally cylindrical collar having a diameter sized smaller than said generally circular hole of said bottom connecting base of said hitch lock and said raised base mounting shoulder having a diameter sized greater than said generally circular hole of said bottom connecting base;

wherein said bottom connecting base of said hitch lock is rotatably mounted through said generally circular hole to said generally circular collar of said ball hitch and is restrained from axial movement along said elongate member toward said generally spherical ball by said raised base mounting shoulder.

14. The combination of claim 13 wherein said attachment shaft is threaded.

15. The combination of claim 13 wherein said elongate attachment shaft is removably connected to said first end of said elongate member.

16. The combination assembly of claim 13 wherein said lock means comprises a key actuated tumbler means arranged to secure a pin from axial movement in a bore.

* * * * *